Patented May 5, 1953

2,637,711

UNITED STATES PATENT OFFICE 2,637,711

PIGMENT DISPERSIONS IN WATER

Laszlo Auer, South Orange, N. J.

No Drawing. Application June 22, 1950,
Serial No. 169,791

20 Claims. (Cl. 260—29.2)

General Outline of Invention

Water dispersions of organic pigments have many applications. They are used to color natural and synthetic latex compositions, to color paper in the paper industry and in combination with binders to color textiles by printing or padding.

The organic pigments are hydrophobic in nature and their press cakes contain about 14% to 35% pigment and 65% to 86% water. The large water content of the press cakes indicates the hydrophobic nature.

To make useful pigment dispersions in water, it is necessary to wet out the pigment particles individually and to break up aggregates of pigment particles formed during pressing and washing the press cake or during subsequent drying to dry powder pigment.

Numerous methods and wetting agents and dispersing agents are described in the literature for this purpose. However, the color value of these dispersions is comparatively low, as marketed today by most suppliers.

The purpose of this invention is to prepare in a simple manner organic pigment dispersions in water with high color yield and tinting power. This purpose is accomplished by the use of fatty alcohol sulfates as dispersing and wetting agents. Sodium salts are satisfactory. These agents work well alone, but their action is improved by adding smaller quantities of sodium alkyl sulfonates. Small additions of protective colloids like casein and methyl cellulose may be added for further improving properties.

Pigments Used in Making Water Dispersions

The organic pigments used herein are usually prepared by precipitation methods. They are all water insoluble. As starting material for this invention either a filter press cake or dry powder can be used. Carbon black, if used, is not made by precipitation method and is used as dry powder in the process.

The following groups of pigments are exemplifying, but not limiting the scope of the starting materials of this invention:

(1) Phthalocyanine pigments

Phthalocyanine blue, which is a copper or tin-copper phthalocyanine, is marketed under trade names of Monastral Fast Blue by E. I. du Pont de Nemours & Co. and as Heliogen Blue by General Dyestuff Corporation.

Phthalocyanine green, which is a chlorinated copper phthalocyanine color, is marketed under trade names of Monastral Fast Green, by E. I. du Pont de Nemours & Co. and as Heliogen Green by General Dyestuff Corporation.

A newer phthalocyanine color is marketed as Monastral Fast Gold Green by E. I. du Pont de Nemours & Co.

(2) Insoluble azo pigments

Benzidine yellows are couplings between dichlorobenzidine and acetoacetic arylides, such as the acetoacetic-anilide, -ortho toluidide, -xylidide, -para chloro analide and -ortho chloro analide.

Benzidine orange is a coupling product of dichlorobenzidine with pyrazolone substitution products, such as methyl phenyl pyrazolone.

Hansa yellows are acetoacetic arylide couplings with substituted anilines, like 4-chloro-2-nitroaniline, or orthonitraniline, amongst others.

Insoluble azo reds are coupling products of the Naphthol AS type compounds of beta-ortho-naphthoic acid, such as Naphthol AS, Naphthol AS-OL, Naphthol AS-BS, Naphthol AS-D with fast color salts, such as 2,5-dichloroaniline, p-nitro - orthotoluidine, p - nitro - orthoanisidine, amongst others. One example being the coupling product of Naphthol AS-ITR with ITR fast color salt. (Fast red color salt ITR.)

Naphthol AS type couplings may yield also yellows and oranges of the insoluble azo pigment group. Aniline black pigment can be listed here too.

Toluidine Maroon and Dianisidine Blue and a brown pigment obtained by forming the copper salt of para-nitraniline red are other examples.

(3) Vat pigments

Vat pigments are of the indigoid or anthraquinone type. The indigoid type includes thioindigo derivatives and the anthraquinone type includes derivatives of Flavanthrene, Benzanthrone and complex structures made by condensing benzanthrone molecules.

Thioindigo Red B has Color Index No. 1207 and Schultz No. 912. Thioindigo Pink has Color Index No. 1211 and Schultz No. 910. For formulation, i. e. structural formula see pages 203 and 209 in Pratt: Chemistry and Physics of Organic Pigments, John Wiley & Sons, 1947.

Indanthrene Blue Color Index No. 1106, Schultz No. 837 is an example of the anthraquinone type vat pigments.

Structural formulas of some vat pigments are listed on pages 429 to 435 in volume V of Mattiello: Protective and Decorative Coatings, John Wiley & Sons, Inc., New York, 1946. They include Indanthrene Rubine RD, Indanthrene Orange RRTA, Indanthrene Golden Orange GA, Indanthrene Brown RA, Helio Fast Yellow 6GL, Indanthrene Brilliant Violet 3BA, Fast Violet 4RN, Indigo Blue, Indanthrene Navy Blue RA.

The present dispersion method of this invention is applicable in vat pigment dispersions, which are not intended to be used as pigments, but applied for dyeing or printing in the textile industry also, which application includes forming a water soluble leuco compound from the vat pigment and re-oxidizing same in a subsequent step. A better dispersion of the pigment in water will yield better results as far as color value is concerned, after reduction and re-oxidation. Conventional additives should be added, like flow agents, hygroscopic agents, known in the art for this type of application.

(4) Carbon blacks

Furnace blacks, channel blacks, acetylene gas blacks and lamp blacks can also be dispersed by the instant process.

DISPERSING AGENTS

The dispersing agents of this invention are fatty alcohol sulfates, such as sodium, ammonium or triethanol amine salts of sulfates of lauryl alcohol, cetyl alcohol, oleyl alcohol and their mixtures. These agents are known in the art to form emulsions and are used as detergents, but their use as pigment dispersing agents is believed to be novel.

Sulfates of hydroabietyl alcohol act similarly to fatty alcohol sulfates.

Examples of commercial products are Duponol ME, which is a dry powder form of sodium lauryl sulfate, manufactured by E. I. du Pont de Nemours & Co., and Duponol WA paste, which is a water paste of the same compound, containing 30% active ingredient and some inorganic salt impurities.

It was found, that the action of fatty alcohol sulfates is greatly enhanced and improved by using as further additive a minor quantity of sodium alkyl naphthalene sulfonates, such as the isopropyl naphthalene sulfonate and the isobutyl naphthalene sulfonate. The former is marketed under the trade name of Nekal A by the General Dyestuff Corporation and the latter as Nekal BX by the same company.

Protective colloids

Further improvement in degree of deflocculation of the pigment is obtained, by adding protective colloids to the water dispersion, such as casein and methyl cellulose.

PROPORTIONS OF ADDITIVES TO PIGMENT CONTENT

The proportions of surface active agent to pigment content is very important. The fatty alcohol sulfates may be added in proportions of 2 to 20% per 100 parts of dry pigment, but for complete deflocculation of the pigment at least 10% and preferably 15 to 20% are used. Higher proportions of fatty alcohol sulfate are permissible, but does not seem to produce further improvement, in deflocculation, to a degree to warrant such increase. Larger proportions may be used, however, to satisfy specialty purposes of incorporation into finished products or to satisfy machinery limitations.

The sodium alkyl naphthalene sulfonates are added in proportions of ½% to 4% based on the pigment content, 2% being a preferred and satisfactory proportion.

If protective colloids are added, about 1% of dry casein is used, based on the dry pigment content and about 5% methyl cellulose low viscosity type, designated as 15 cps. type in the trade. Larger quantities of protective colloids can be added, but their action is distinct in the here given proportions. They help to complete deflocculation and keep the particles in suspension.

COLOR DEVELOPMENT

To illustrate the advantages of the dispersions made according to this invention, we have to discuss the meaning of the expression "color value." Pigments have a property known as hiding power. Hiding power is needed in paints which are applied on a different base color, to hide the color of the undercoat. Hiding power is measured by painting measured quantities on black and white checkerboard design, on so called hiding power charts and the quantity of pigment needed per surface area which will hide equally the black and white squares of the chart, is used to express hiding power. The hiding power in the pigment dispersions and end use of the pigments here discussed has little or no importance. There is another property of pigments, called tinting power, which is of importance with these pigments. Tinting power is measured by adding a dispersed color to a white opaque paint and measuring the strength of tinting caused by a unit of added colored pigment. For the purposes of this process color development means increased tinting power.

In printing on textiles with resin emulsion pigment colors, as described in my copending application Ser. No. 91,009, filed May 2, 1949, the color effect is caused by the transparent pigments through their tinting effect on the white background of the textile fabric. Increased color development will show stronger color effect in printing.

It is known to those skilled in the art, that if e. g. one pound of phthalocyanine blue pigment is dispersed and incorporated into a water-in-oil emulsion color concentrate and this is reduced with a clear emulsion extender to yield a certain shade in a ratio of e. g. 1 part of color concentrate by volume and 20 parts of extender emulsion by volume, and the same one pound of phthalocyanine blue is incorporated into an oil-in-water resin emulsion color concentrate, and the above shade is matched for strength by adding an oil-in-water extender clear to the color concentrate, the mileage of the oil-in-water color concentrate is much lower, than that of the water-in-oil color concentrate, having the same pigment content, and to match the formerly mentioned 1:20 cut shade of the water-in-oil emulsion, we have to go as low as 1:5 or 1:10 with an oil-in-water emulsion color. In other words, using heretofore known conventional dispersion methods and agents, oil-in-water resin emulsion colors could not be used successfully in competition with water-in-oil colors, as the former gave 25% to 50% color values with the same pigment content, whereas the later had 100% color value. Using the instant dispersions in oil-in-water emulsions, the color value of 100% may be reached or even surpassed. In the same manner in coloring latex compositions for dipping or knife coating or roller coating applications, increased color values are obtainable with the new dispersions and improvement can be shown in paper beater coloring applications also.

Improvement in vat color printing is also noticeable.

Conventional Pigment Dispersing Agents

The hydrophobic nature of the pigments herein treated is exemplified by the high water content of the press cakes, which all look like more or less dry mud, and still have low pigment content. The conventional pigment dispersing agents make this false structure collapse, by wetting out the pigment particles upon addition of smaller quantities of agents.

Examples of such agents are: sodium lignin sulfonate, partially desulfonated sodium lignin sulfonate, calcium lignin sulfonate, polymerized sodium salts of short chain alkyl naphthalene sulfonic acids, condensed aryl sulfonates, polyethylene oxide condensation products with aryl sulfonates, amongst others. They are marketed under trade names, e. g. of Marasperse N, Marasperse C, Marasperse CB, Darvan 1, Daxad 11, Tamol P, Blancol and others.

Liquefaction of press cakes occur with these agents upon addition of 1% to 2% active agent, based on pigment content.

In contrast to these conventional agents, the fatty alcohol sulfates alone or in combination with Nekal A, or Nekal A alone, will not cause liquefaction of press cakes in percentage ranges of total active agent ranging from 2% to 4%, and therefore are not considered as pigment dispersing agents in the art.

It has been found during the investigation leading to the instant process, that whereas the former conventional pigment dispersing agents will liquefy press cakes at low concentrations, they do not cause complete deflocculation of the pigment particles in water and optimum color value. On the other hand, whereas larger quantities have to be added of the agents of this invention before liquefaction of the press cake to a slurry occurs, by proper proportions of these agents and proper equipment optimum deflocculation and color value is developed.

As may be seen in the illustrative examples, the pigment dispersing agents of this invention are in solution in the water of the pigment dispersion and the pigment is in direct contact with said solution.

EXAMPLES

To illustrate the instant invention, a few examples are given here below. The examples are meant to illustrate the process and not to limit same.

Example 1

Phthalocyanine Blue presscake, marketed under the trade name of Heliogen Blue BV presscake by the General Dyestuff Corporation, 21.2% dry pigment content was used as starting material. To 5,448 grams press cake add 57.7 grams of a 40% Nekal A solution in water, 346.2 grams Duponol WA paste 30% active ingredient (sodium lauryl sulfate, technical). After premixing the product was not thin enough to be fed into a disintegrator (hammer mill) and 11.5 grams of Tamol N, also marketed as Blancol by Roehm and Haas of Philadelphia was added to get full liquefaction. Resulting product composed of 19.69% blue pigment, 0.39% Nekal A, 1.77% Duponol dry, 0.20% Tamol and 77.95% water. On 100 parts pigment the quantity of Nekal A was 2% and the quantity of Duponol 9%. This slurry was passed through the disintegrator and portions of it were colloid milled on a Premier mill of 4" rotor diameter at slow speed and at 10 mil clearance between stator and rotor.

Example 2

To 5448 grams of press cake used in Example 1, using similar solutions as in Example 1, 57.7 grams of Nekal solution, and 692.4 grams of Duponol WA paste were added. After pre-mixing the slurry became liquid and was passed through the disintegrator and in part through the colloid mill, as in Example 1. The resulting slurry contained 18.63% blue, 0.37% Nekal A, 3.35% Duponol and 77.65% water. The Nekal A addition was 2% on pigment content and the Duponol addition was 18% on pigment content.

Example 3

From the press cake used in Examples 1 and 2, and using same solutions of additives, a preparation was made using 5448 grams press cake, 57.7 grams of Nekal A solution, 173.2 grams of Duponol WA paste. In this example the Nekal A was 2% on pigment content and the Duponol 4½% on pigment content. The mixture was not liquid enough to pass it through the disintegrator and Tamol was added, 17.25 grams, to obtain full liquefaction. The pigment content of finished slurry was 20.27%, Nekal A 0.40%, Duponol 0.91%, Tamol 0.31% and water 78.11%. Part of the slurry was passed through the colloid mill.

Example 4

To 5448 grams of the press cake used in the previous examples 346.2 grams of Duponol WA paste was added, to form a 9% active agent addition to 100 parts of dry pigment. 34.5 grams of Tamol N (Blancol) was required to liquefy the slurry sufficiently, that it could be passed through the disintegrator. Part of the slurry was subsequently colloid milled. The composition of end product was 19.81% pigment, 1.69% Duponol and 0.68% Tamol, 77.82% water.

Constants of the disintegrator treated slurries of Examples 1 to 4 were as follows:

|  | Example 1 | Example 2 | Example 3 | Example 4 |
|---|---|---|---|---|
| Tamol dry | 11.5 grams | none | 17.25 grams | 34.5 grams. |
| pH | 7.9 | 8.3 | 7.8 | 7.8. |
| Physical Appearance | medium visc. | thin, pourable | medium visc. | medium visc. |
| Viscosity | 1,337 cps | 25,353 cps | 9,2,631 cps | 38,186 cps. |

Example 5

To a phthalocyanine green press cake, marketed under the trade name of Heliogen Green GV press cake, having 27.6% pigment content Duponol ME dry powder was added to yield 18% Duponol on the pigment content and Nekal A dry powder was added to yield 2% addition on the pigment content. The press cake was mixed with a spatula by hand and after 5 minutes it became completely liquid. It has been found, that dry powder addition, which is attractive as it does not increase water content, yield very satisfactory results. However, the pre-mixing represents some problem and knife pronged agitators are needed, such as pony mixer blades, to liquefy the press cake to a slurry. Propeller types, or other turbine type agitators do not work well at this stage, as they could not manage to break up the lumps of the press cake. The premix is then further dispersed by the aid of an Eppenbach Homomixer, which is a high speed turbo mixer, having a narrow clearance between turbine and stator. It runs about 3600 R. P. M. About 15 minutes is satisfactory, but occasionally up to 30 minutes may be used. A 5 H. P. motored mixer satisfactorily disperses a 500 lb. press cake quantity in a 55 to 60 gal. size drum. (Open head drum.) The active ingredient in Duponol ME dry powder is the same as that of Duponol WA paste, i. e. technical sodium lauryl sulfate.

The homomixed slurry is passed through a colloid mill, to complete dispersion and defloccuation. Pebble milling is also very satisfactory to complete pigment defloccuation and dispersion. 24 hours to 48 hours are satisfactory milling times.

Example 6

100 lbs. of Benzidine yellow, which is a coupling product of dichlorobenzidine and acetoacetic acid orthotoluidide, 2 lbs. of Nekal A dry, 18 lbs. of Duponol ME dry and 280 lbs. of water are mixed in a pony mixer until a slurry is formed. This slurry has 25% pigment content. It is homomixed for 30 minutes and colloid milled to complete pigment defloccuation. Colloid milling may be replaced by pebble milling. Another satisfactory machine to disperse or complete dispersion, is the Gaulin homogenizer, which is a valve type homogenizer working under pressure and is fed by a reciprocal displacement type booster pump. 3000 to 5000 pounds per square inch pressure is satisfactory to complete defloccuation of the pigment. This machine works in a continuous manner, like colloid mills, in contrast to the batch process type working manner of a pebble mill.

In this example instead of the Benzidine yellow, insoluble azo reds may be used also, such as the coupling product of Naphthol AS-OL with Fast Scarlet Salt GG, or of Naphthol AS with p-nitro-o-toluidine, or Naphthol AS-BS coupled with p-nitro-o-anisidine, or Naphthol AS-D coupled with p-nitro-o-toluidine.

Example 7

Example 5 is repeated, using instead of the green press cake a press cake of Thioindigo Maroon of 16.1% pigment content, marketed by Harmon Color Works under the trade name of Indo Maroon MV-1, or Anthragen Violet RH by General Dyestuff Corporation.

Example 8

Example 6 is repeated, using instead of the Benzidine yellow, Thioindigo Pink FF dry powder.

Example 9

Example 5 is repeated, adding to the slurry ammonium caseinate solution in water, with 20% casein content, in a quantity to yield 1% casein addition to 100 parts of dry pigment. This is added under the Homomixer.

Example 10

Example 9 is repeated, by further adding before completing the homomixing operation a 10% water solution of low viscosity methyl cellulose, 15 cps. viscosity type in quantity to yield 5% dry methyl cellulose addition on the pigment content.

Example 11

Example 5 is repeated, adding to the slurry under the homomixer a 10% water solution of low viscosity methyl cellulose, 15 cps. viscosity type in a quantity to yield 5% dry methyl cellulose addition on the pigment content.

The pigment slurries of Examples 1 to 11 are eminently suitable to form color concentrates of oil-in-water resin emulsion pigment color concentrates, as described in my copending application of Serial No. 91,009, of which the application is a continuation-in-part. When extended with extender emulsions, these color concentrate emulsions yield brilliant prints, with excellent color yield and good washability. I have found, that complete defloccuation of pigments is essential in obtaining laundering resistant prints and such is obtained using the pigment slurries made according to the instant invention.

In Example 2 of my copending application Serial No. 91,009, I have described a dehydrated castor oil fatty acid ester formed with an alcohol, which is derived by condensing epichlorhydrin and bisphenol. From this resin a suitable oil-in-water emulsion can be prepared, as described in Example 18 of said copending application in the folowing manner: 42.15 parts of said resin dissolved in xylol, 50% resin content, 0.31 part of mixed naphthenate driers, 12.22 parts of 10% sodium lauryl sulfate solution in water, 20.65 parts of a 20% casein solution in water, containing antifouling agents, 5.48 parts of ammonium hydroxide solution prepared by mixing 1 part of concentrated ammonium hydroxide and 1 part of water, 10.54 parts of a 20% water solution of sodium carboxymethylcellulose, low viscosity type, and 8.65 parts of water, are made into an emulsion in the following manner: Add to the resin solution under agitation 2/3 of the sodium lauryl sulfate solution, mix the remaining 1/3, the water and the casein solution in a separate container and add them slowly to the resin solution containing mixture under agitation. Add the ammonium hydroxide solution and add finally the sodium carboxymethylucellulose solution. Homogenize. This emulsion is a suitable binder for color concentrates. With this binder emulsion a color concentrate can be prepared similar to the one described in Example 19 of said copending application.

Whereas the herein claimed surface active agents are believed to be essential for the success of this invention, conventional type pigment dispersing agents may be present as additives.

Carbon black is considered, from the point of view of this invention, a hydrophobic organic pigment and may be dispersed according to Example 6, replacing carbon black for the pigment in the example.

Nekal A is defined by the manufacturer as short chain alkyl substituted naphthalene sulfonate, sodium salt, with alkyl chain length shorter than hexyl. Whereas the alkyl chain may be a mixture of isomers and of varying chain length, applicant believes, that isopropyl naphthalene sulfonte, sodium salt is the major constituent.

If casein is added, it may range from 1/2% to 50% of pigment content, but good results were obtained with as little as 1%. Low viscosity methyl cellulose may be used in the range of 1% to 10% on the pigment content. 5% yields good results.

I claim:

1. The dispersion of claim 14, comprising a short chain alkyl substituted naphthalene sulfonate as auxiliary agent, said alkyl chain being shorter than a hexyl chain.

2. The dispersion of claim 14, in which the fatty alcohol sulfate is sodium lauryl sulfate.

3. The dispersion of claim 14, in which as auxiliary agent sodium isopropyl naphthalene sulfonate is present.

4. The dispersion of claim 14, comprising a copper phthalocyanine pigment.

5. The dispersion of claim 14, comprising an insoluble azo pigment.

6. The dispersion of claim 14, comprising a vat pigment.

7. The dispersion of claim 14, comprising carbon black pigment.

8. The dispersion of claim 14, comprising about 18% sodium lauryl sulfate and about 2% sodium short chain alkyl substituted naphthalene sulfonate, based on pigment content.

9. The dispersion of claim 14, comprising casein as protective colloid in the proportion of ½% to 50% of the dry pigment content.

10. The dispersion of claim 14, comprising methyl cellulose as protective colloid in the proportion of 1% to 10% of the dry pigment content.

11. Process to prepare completely deflocculated dispersions of by nature hydrophobic pigments in water by incorporating a water soluble fatty alcohol sulfate into a mixture of water and pigment, mixing the mixture and passing the slurry through a pigment dispersing equipment, said fatty alcohol sulfate being a member of the class consisting of salts of sulfates of lauryl alcohol, cetyl alcohol and oleyl alcohol, and said sulfate being applied in proportions of 9 parts to 20 parts for each 100 parts of hydrophobic pigment.

12. Process to prepare completely deflocculated dispersions of by nature hydrophobic pigments in water by incorporating sodium lauryl sulfate into a mixture of water and pigment, mixing the mixture and passing the slurry through a pigment dispersing equipment, in which process, based on 100 parts of dry pigment, 4% to 20% sodium lauryl sulfate and ½ to 2% short chain substituted alkyl naphthalene sulfonate, sodium salt are mixed into said mixture of water and pigment.

13. The process of claim 11, in which about 1% casein and about 5% low viscosity methyl cellulose are added from water solution to the mixture, based on the dry pigment content.

14. Dispersion of a by nature hydrophobic organic pigment in water, comprising (1) a press cake component and (2) a dispersing agent component, said press cake component comprising 14% to 35% of hydrophobic organic pigment and 65% to 86% of water, and said dispersing agent component comprising a water soluble fatty alcohol sulfate, which is a member of the class consisting of salts of sulfates of lauryl alcohol, cetyl alcohol and oleyl alcohol, said dispersing agent component being used in proportions of 9% to 20% of fatty alcohol sulfate, based on the dry pigment content of the press cake component, said dispersing agent being in solution in said water and said pigment being in direct contact with said solution.

15. The dispersion of the claim 14, in which the fatty alcohol sulfate is a sodium salt.

16. The dispersion of claim 14, in which the fatty alcohol sulfate is an ammonium salt.

17. The dispersion of the claim 14, in which the fatty alcohol sulfate is a triethanolamine salt.

18. Dispersion of a by nature hydrophobic pigment in water, comprising (1) a water-and-pigment mixture component and (2) a dispersing agent component, said water-and-pigment mixture component consisting of 14% to 35% of hydrophobic organic pigment and 65% to 86% of water, and said dispersing agent component comprising a water soluble fatty alcohol sulfate, which is a member of the class consisting of salts of sulfates of lauryl alcohol, cetyl alcohol and oleyl alcohol, said dispersing agent component being used in proportions of 9% to 20% of fatty alcohol sulfate, based on the dry pigment content, said dispersing agent being in solution in said water and said pigment being in direct contact with said solution.

19. Dispersion of a by nature hydrophobic pigment in water, comprising (1) a carbon black and water mixture component and (2) a dispersing agent component, said carbon black and water mixture component consisting of 14% to 35% of carbon black and 65% to 86% of water, and said dispersing agent component comprising a water soluble fatty alcohol sulfate, which is a member of the class consisting of salts of sulfates of lauryl alcohol, cetyl alcohol and oleyl alcohol, said dispersing agent component being used in proportions of 9% to 20% of fatty alcohol sulfate, based on the dry carbon black content, said dispersing agent being in solution in said water and said carbon black being in direct contact with said solution.

20. An oil-in-water resin emulsion pigment color concentrate comprising the dispersion of claim 18.

LASZLO AUER.

References Cited in the file of this patent

UNITED STATES PATENTS

| Number | Name | Date |
| --- | --- | --- |
| 2,046,757 | Tucker | July 7, 1936 |
| 2,230,353 | Kern | Feb. 4, 1941 |
| 2,342,641 | Cassel | Feb. 29, 1944 |
| 2,342,642 | Cassel | Feb. 29, 1944 |

FOREIGN PATENTS

| Number | Country | Date |
| --- | --- | --- |
| 453,786 | Great Britain | Sept. 18, 1936 |